March 19, 1940.  B. E. SHAW  2,194,129
TIRE INFLATER
Filed Aug. 7, 1939  2 Sheets-Sheet 1

Inventor:
Burton E. Shaw,
By: Bair & Freeman
Attorneys

March 19, 1940.　　　B. E. SHAW　　　2,194,129
TIRE INFLATER
Filed Aug. 7, 1939　　　2 Sheets-Sheet 2
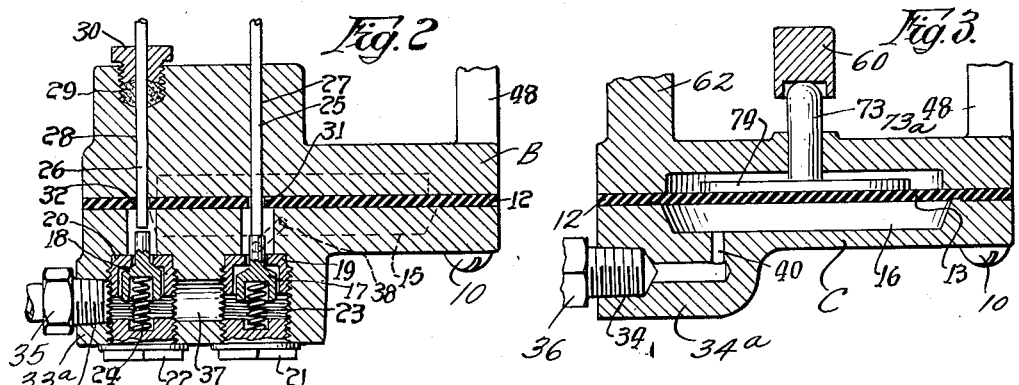
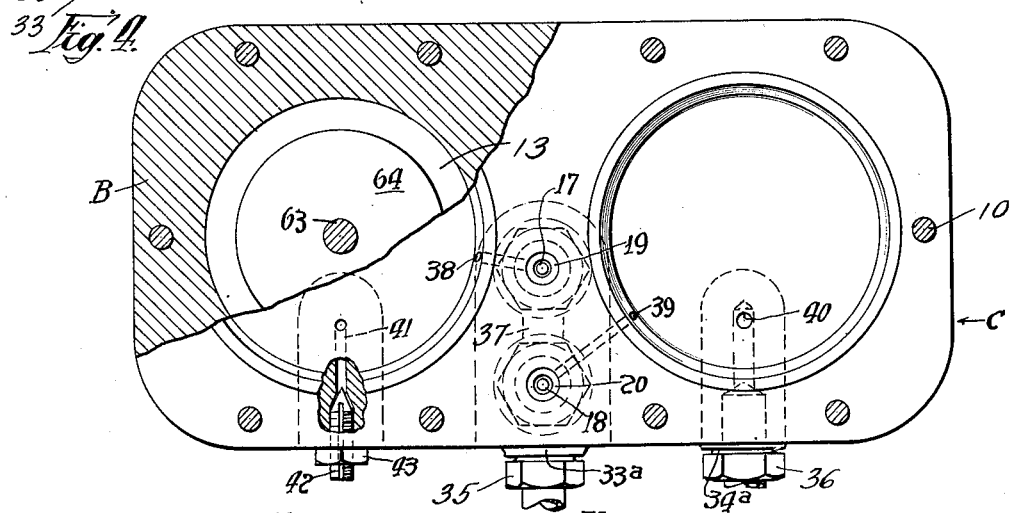
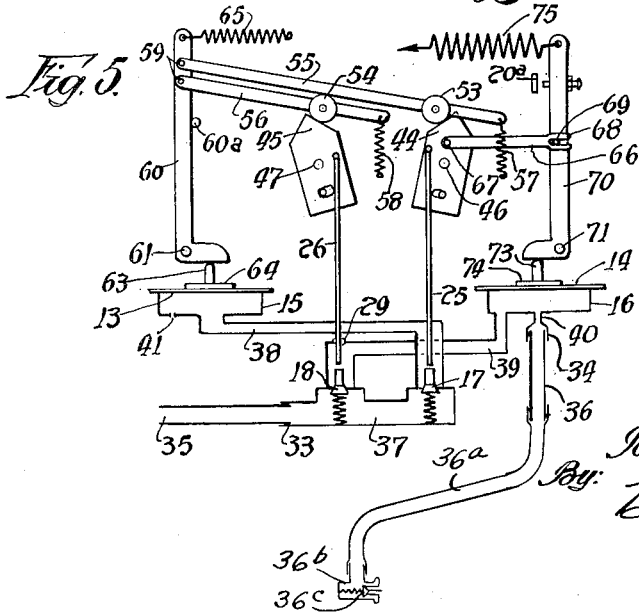
Inventor:
Burton E. Shaw,
By: Bair & Freeman
Attorneys.

Patented Mar. 19, 1940

2,194,129

UNITED STATES PATENT OFFICE 2,194,129

TIRE INFLATER

Burton E. Shaw, Bristol, Ind., assignor to Penn Electric Switch Co., Goshen, Ind., a corporation of Iowa Application August 7, 1939, Serial No. 288,837

12 Claims. (Cl. 221—73.5)

An object of my present invention is to provide a tire inflater of simple, durable and inexpensive construction wherein provision is made for facilitating the manufacture of the parts of the tire inflater and for also facilitating the assembly thereof.

A further object is to provide a tire inflater having improved operating characteristics with respect to the Penn Patent No. 1,618,953, of February 22, 1927, reissued June 5, 1934, as No. 19,201, and which is designed to eliminate certain necessary copper tubing connections and in general condense the apparatus of the inflater and make it more adaptable for manufacturing than the inflater apparatus shown in the Barker Patent No. 2,162,474, of June 13, 1939.

More specifically, it is an important object of my invention to provide a tire inflater that has cycling and gauging diaphragms and cycling and air admission valves with a diaphragm and valve assembly comprising a base plate on which the operating mechanism of the inflater is mounted and a cover plate having recesses that constitute diaphragm chambers and provided with means to mount the valves in the cover plate and port them properly to the cycling and gauging diaphragms and also to atmosphere, to an intake passageway and to an outlet passageway, all of which are provided in the cover plate.

Still another object is to provide a packing gland for the air admission valve which is mounted in the base plate and to provide the cover plate for the diaphragms effective to make all internal air connections and at the same time seal the diaphragms and form them of a single sheet of material clamped between the base plate and the cover plate.

Other objects, purposes and characteristic features of the present invention will be in part obvious from the accompanying drawings and in part pointed out as the description of the invention progresses. In describing the invention in detail, reference will be made to the accompanying drawings in which like reference characters designate corresponding parts throughout the several views, and in which Figure 1 is a rear elevation of a tire inflater embodying my invention;

Figure 2 is a sectional view on the line 2—2 of Figure 1 showing the valve assembly of the inflater;

Figure 3 is a sectional view on the line 3—3 of Figure 1 showing a typical diaphragm assembly;

Figure 4 is a sectional view on the line 4—4 of Figure 1 showing the porting arrangement in the cover plate of my tire inflater, and Figure 5 is a diagrammatic view illustrating the various elements of the tire inflater in their relation to each other, and to facilitate describing the operation of the inflater.

Figure 1:
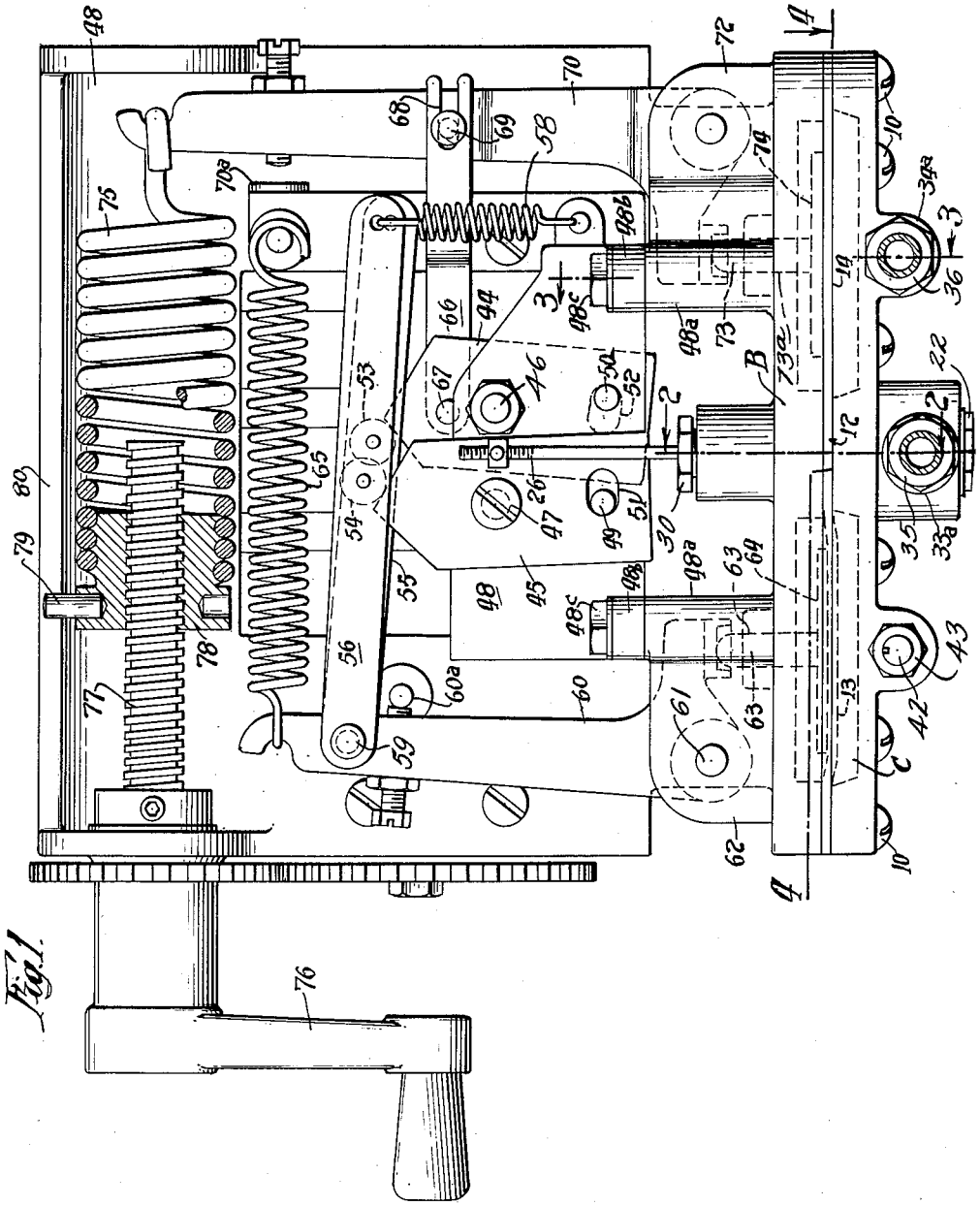

My tire inflater includes a base plate B and a cover plate C which are assembled together as by a plurality of screws 10. A sheet of rubber or other suitable flexible composition 12 is interposed between the plates B and C serving both as a gasket between them and as cycling and gauging diaphragms indicated at 13 and 14, respectively. The cover plate C is provided with a pair of recesses 15 and 16 forming respectively a cycling diaphragm chamber and a gauging diaphragm chamber.

Referring to Figure 2, a cycling valve 17 and an air admission valve 18 are provided. Seat members 19 and 20 are screwed into the cover plate C from the lower surface thereof and sealed in position by plugs 21 and 22. Springs 23 and 24 are interposed between the plugs and valves to normally retain the valves seated.

For operating the valves 17 and 18, stems 25 and 26 are provided. The stem 25 is guided in a bore 27 of the base plate B and the stem 26 is guided in a bore 28 of the base plate. A packing 29 and a packing gland 30 are provided for the stem 26. The diaphragm sheet 12 is provided with perforations 31 and 32 through which the stems 25 and 26 pass.

The cover plate C is provided with an inlet passageway 33 and an outlet passageway 34 formed in bosses 33a and 34a of the cover plate C. An inlet conduit 35, such as a fitting for copper tubing is screwed in the passageway 33 while a similar fitting 36 is screwed in the passageway 34. The fitting 35 receives compressed air from a compressed air tank or the like, as generally found at an automobile service station, while the fitting 36 connects with an air hose 36a having the usual tire chuck 36b with self-contained check valve 36c on the discharge end for coaction with the tire valves of automobile tires to be serviced.

The cover plate C is provided with a series of ports. The valve seats 19 and 20 are connected together by a port 37 as shown in Figure 2 whereby both valve seats communicate with the source of air 35. The discharge sides of the valves 17 and 18 are connected by ports 38 and 39 with the cycling diaphragm chamber 15 and the gauging diaphragm chamber 16 respectively. A port 40 connects the gauging diaphragm chamber 16 with the inlet passageway 34. For the cycling diaphragm chamber 15, I provide a vent passageway 41 to atmosphere. The size of the vent and thereby the rate of air escape is adjustable by means of a needle valve 42, the adjustment of which may be retained by a lock nut 43.

The foregoing described parts, it will be noted, are few in number and simple in construction and assembly. When the screws 10 are driven home, the plates B and C are sealed relative to each other and all connections between inlet, atmosphere, outlet, the valves and the diaphragm chambers are taken care of by the porting arrangement in the cover plate C without the necessity of any piping between these parts, as in the Barker patent hereinbefore referred to.

As to the remaining operating parts of the tire inflater, which will now be described, they are essentially similar to those disclosed in the Barker patent with a slight rearrangement of parts to accommodate the valves 17 and 18 mounted in the cover plate C. These operating parts include V cam levers 44 and 45 pivotally supported at 46 and 47 on a back plate 48 of the base plate B. The base plate 48 has ears 48b secured by screws 48c to bosses 48a. The bosses 48a extend upwardly from the base plate B.

The cycling and air admission valve stems 25 and 26 are pivoted to the cam levers 44 and 45 for permitting the valves to close when the pivotal connections move upwardly and opening the valves when the pivotal connections move downwardly. The cam levers 44 and 45 are limited in their swinging motion by stop pins 49 and 50 received in slots 51 and 52 of the cam levers 44 and 45.

The cam levers 44 and 45 are adapted to be operated by cam rollers 53 and 54 carried by links 55 and 56 and held in engagement with V cam surfaces on the upper ends of the levers 44 and 45 by springs 57 and 58. The levers 55 and 56 are connected to a pivot pin 59 carried by a cycling bell crank 60. The bell crank 60 is pivoted on a pin 61 supported by a boss 62 extending upwardly from the base plate B. The short end of the bell crank lever 60 is held in contact with a follower pin 63 of a follower plate 64 pressed against the cycling diaphragm 13 by a cycling spring 65.

In addition to the roller 54, a link 66 is provided for operating the cam lever 44. One end of the link 66 is pivoted at 67 to the cam lever and the other end has a slot 68 straddling a headed pin 69 extending from a second bell crank lever 70. The lever 70 is pivoted on a pin 71 carried by a boss 72 of the plate B. The short end of the bell crank lever 70 engages a follower pin 73 of the diaphragm follower 74 which is held in contact with the gauging diaphragm 14 by an adjusting spring 75. Pins 63 and 73 are guided in bores 63a and 73a of the base plate B.

For adjusting the spring 75, a crank 76, a threaded rod 77 and a nut 78 are provided. The nut 78 is mounted in one end of the spring 75 and has a pin 79 traversing a slot 80 to permit longitudinal but prevent rotational movement of the nut 78 when the adjusting crank 76 is rotated. The rod 77 of course is fixed relative to the crank 76 and thereby rotates relative to the nut 78.

*Practical operation*

Referring to Figure 5, the fitting 36 when connected to a tire allows air to pass to the tire if the pressure in the tire is less than the setting of the spring 75. Reduction of pressure against the gauging diaphragm 14 causes the bell crank 70 to swing counterclockwise to a position for the roller 53 to pass over the crest of the V cam at the top of the cam lever 44, if the pressure against the diaphragm 14 is lowered to less than the setting of the spring 75.

As a result, the spring 57 pulls the roller 53 downwardly along the right hand incline of the cam lever 44, thus rotating the lever counterclockwise and opening the cycling valve 17. Such counterclockwise rotation of the lever 44 is permitted by the slot and pin connection at 68—69. Tank pressure from the fitting 35 then flows past the valve 17 and under the cycling diaphragm 13. The vent at 41 permits escape of the air from under the diaphragm but the escape is restricted by the needle valve 42 so that pressure builds up and the diaphragm flexes upwardly to swing the bell crank 60 counterclockwise away from a stop pin 60a and against the bias of the spring 65.

The roller 54 thereafter passes over the crest of the cam lever 45, thereby swinging the lever clockwise to open the air admission valve 18. Air under tank pressure then passes the valve 18 and flows through the port 39, diaphragm chamber 16, port 40, intake passageway 44 and fitting 36 to the tire. A time period after the roller 54 passes the crest of the cam 45, the roller 53 will pass the crest of the cam 44, traveling in a left hand direction because the cam crank 60 is steadily moving toward the left due to the pressure being built up under the diaphragm 13. The timing period will be determined by the size of the vent opening 41 as determined by the adjustment of the needle valve 42.

Passage of the roller 53 to the left over the crest of the cam 44 causes the cam to swing clockwise, thus again closing the cycling valve 17. This stops the flow of compressed air to the cycling diaphragm 13 and the air escapes from the cycling diaphragm chamber 15 through the vent 41 to atmosphere. The resulting reduction in pressure under the cycling diaphragm permits the bell crank 60 to be rotated clockwise by the spring 65. The rollers 53 and 54 are thereby forced in a right hand direction toward the crests of the cams 44 and 45. The roller 54 first passes the crest of the cam lever 45, whereupon the lever is turned counterclockwise and permits the air admission valve 18 to close.

While the valve 18 was open, air flowed through the fitting 36 to the tire. The relation between supply pressure from the fitting 35, back pressure from the tire through the fitting 36 and the fluid resistance of the entire conduit system, including 37, 39, 16, 40, 34, 36, and the air hose 36a leading to the tire, will determine whether or not the pressure under the gauging diaphragm 14 rises above the pressure for which the spring 75 is adjusted. If this pressure does rise higher, then the bell crank 70 will remain in its clockwise position spaced from a stop boss 70a and there will be no further shots of air.

If the pressure in the tire is insufficient, however, as determined by the setting of the spring 75, then the diaphragm 14 will be depressed by the spring and the cam lever 44 will swing counterclockwise under the roller 53 to initiate another cycle. The cycles of course will be repeated until the tire is satisfied.

In the manufacture of a tire inflater in accordance with my invention as above disclosed, the cover plate C has all the necessary air connections made by the porting arrangement in it and it is merely necessary to hook up the fittings 35 and 36 for air at tank pressure and an outlet to the tire. The valves are mounted in the cover plate so that they can be ported relative to the inlet and outlet passageways and relative to the diaphragm chambers 15 and 16 without the necessity of any copper tubing connections between these parts.

Having described one specific embodiment of my invention together with the operation thereof, I desire it to be understood that this form is selected merely for the purpose of facilitating disclosure of the invention rather than for the purpose of limiting the number of forms which it may assume. It is to be further understood that various modifications, adaptations and alterations may be applied to the specific form disclosed to meet the requirements of practice without in any manner departing from the spirit and scope of the present invention except as set forth in the claims appended hereto.

I claim as my invention and desire to secure by Letters Patent of the United States:

1. In a tire inflater including cycling and gauging diaphragms cycling and air admission valves and mechanism for operatively connecting said diaphragms with said valves; a diaphragm and valve assembly comprising a base plate, a cover plate thereon provided with recesses to cooperate with said diaphragms and thereby provide cycling and gauging diaphragm chambers therefor, said cover plate having valve seats therein for said cycling and air admission valves to cooperate with and having an air inlet boss and an air outlet boss, said cover plate having a first port between said air inlet boss and both of said valve seats, a second port between said cycling valve and said cycling diaphragm chamber, a third port between said air admission valve, said gauging diaphragm chamber and said outlet boss, and an adjustable vent mechanism in said cover plate and effecting communication between said cycling diaphragm chamber and atmosphere.

2. In a tire inflater including cycling and gauging diaphragms, cycling and air admission valves and mechanism for operatively connecting said diaphragms with said valves; a diaphragm and valve assembly comprising a base plate, a cover plate thereon provided with recesses to cooperate with said diaphragms and thereby provide cycling and gauging diaphragm chambers therefor, said cover plate having valve seats therein for said cycling and air admission valves to cooperate with and having an air inlet boss and an air outlet boss, said cover plate having a first port between said air inlet boss and both of said valve seats, a second port between said cycling valve and said cycling diaphragm chamber and a third port between said air admission valve, said gauging diaphragm chamber and said outlet boss.

3. In a tire inflater including cycling and gauging diaphragms, cycling and air admission valves and mechanism for operatively connecting said diaphragms with said valves; a diaphragm and valve assembly comprising a base plate, a cover plate thereon provided with recesses to cooperate with said diaphragms and thereby provide cycling and gauging diaphragm chambers therefor, said cover plate having valve openings therein, valve seat members mounted in said openings for said cycling and air admission valves to cooperate with an air inlet boss and an air outlet boss on said cover plate, said cover plate having ports between said air inlet boss, said valve seat openings and said cycling gauging diaphragm chamber and said outlet boss, and a vent in said cover plate effecting communication between said cycling diaphragm chamber and atmosphere.

4. In a tire inflater including cycling and gauging diaphragms, cycling and air admission valves and mechanism for operatively connecting said diaphragms with said valves; a diaphragm and valve assembly comprising a base plate, a cover plate thereon providing cycling and gauging diaphragm chambers, said cover plate having valve seats therein for said cycling and air admission valves to cooperate with and having an air inlet boss and an air outlet boss, said cover plate having ports between said air inlet boss, said valve seats, said cycling valve, said cycling diaphragm chamber, said air admission valve, said gauging diaphragm chamber and said outlet boss.

5. In a tire inflater including cycling and gauging diaphragms, cycling and air admission valves and mechanism for operatively connecting said diaphragms with said valves and including stemmed diaphragm followers, bell cranks and valve stems for operating the valves; a diaphragm and valve assembly comprising a supporting plate, a single sheet of flexible material on said supporting plate and constituting the cycling and gauging diaphragms, said supporting plate having means for pivoting said bell cranks and guides for said diaphragm follower stems and for said valve stems, a cover plate for retaining said diaphragms against said supporting plate and having a pair of recesses to cooperate with the diaphragms and thereby provide cycling and gauging diaphragm chambers, said cover plate having other recesses therein, valve seats mounted in said other recesses for said cycling and air admission valves to cooperate with, said cover plate having air inlet and air outlet passageways and three ports therein for connecting said air inlet passageway with said valve seats, said valves with said diaphragm chambers and said outlet passageway with said gauging diaphragm chamber, said cycling diaphragm chamber being provided with a vent to atmosphere.

6. In a tire inflater including cycling and gauging diaphragms, cycling and air admission valves and mechanism for operatively connecting said diaphragms with said valves including diaphragm followers, bell cranks and valve stems for operating the valves; a diaphragm and valve assembly comprising a supporting plate, cycling and gauging diaphragms thereagainst, said supporting plate having means for pivoting said bell cranks and guides for said valve stems, a cover plate for retaining said diaphragms against said supporting plate cooperating with the diaphragms to provide cycling and gauging diaphragm chambers, said cover plate having valve seats therein for said cycling and air admission valves to cooperate with, said cover plate having air inlet and air outlet passageways, and ports therein for connecting said air inlet passageway, said valve seats, said valves, said diaphragm chambers and said outlet passageway with each other.

7. In a tire inflater including cycling and gauging diaphragms, cycling and air admission valves and mechanism for operatively connecting said diaphragms with said valves including stemmed diaphragm followers, bell cranks and valve stems for operating the valves; a diaphragm and valve assembly comprising a supporting plate, said supporting plate having means for pivoting said bell cranks and guides for said diaphragm follower stems and for said valve stems, cycling and gauging diaphragms, a cover plate for retaining said diaphragms against said supporting plate and having a pair of recesses to cooperate therewith to provide cycling and gauging diaphragm chambers, said cover plate having other recesses therein, valve seats mounted in said other recesses for said cycling and air admission valves to cooperate with, said cover plate having air inlet and air outlet passageways and a series of ports therein for connecting them and said valve seats, said valves and said diaphragm with each other.

8. In a tire inflater including cycling and gauging diaphragms, cycling and air admission valves and mechanism for operatively connecting said diaphragms with said valves including bell cranks and valve stems for operating the valves; a diaphragm and valve assembly comprising a supporting plate, cycling and gauging diaphragms thereagainst, said supporting plate having means for pivoting said bell cranks and guides for said valve stems, a cover plate for retaining said diaphragms against said supporting plate and having recesses to cooperate with the diaphragms and thereby provide cycling and gauging diaphragm chambers, said cover plate having valve seats therein for said cycling and air admission valves to cooperate with, said cover plate having air inlet and air outlet passageways and a series of ports therein for connecting said passageways with said valve seats, said valves, said diaphragm chambers and with atmosphere.

9. In a tire inflater including cycling and gauging diaphragms, cycling and air admissing valves and mechanism for operatively connecting said diaphragms with said valves and including stemmed diaphragm followers, bell cranks and valve stems for operating the valves; a diaphragm and valve assembly comprising a supporting plate, a single sheet of flexible material on said supporting plate and constituting the cycling and gauging diaphragms, said supporting plate having means for pivoting said bell cranks and guides for said diaphragm follower stems and for said valve stems, a packing gland mounted in said supporting plate for said air admission valve stem, a cover plate for retaining said diaphragms against said supporting plate and having a pair of recesses to cooperate with the diaphragms and thereby provide cycling and gauging diaphragm chambers, said cover plate having other recesses therein, valve seats mounted in said other recesses for said cycling and air admission valves to cooperate with, said cover plate having air inlet and air outlet passageways, and a first port between said air inlet passageway and both of said valve seats, said cover plate having a second port between said cycling valve and said cycling diaphragm chamber and a third port between said air admission valve, said gauging diaphragm chamber and said outlet passageway, said cover plate having a vent opening affording communication between said cycling diaphragm chamber and atmosphere, and a needle valve mounted in said cover plate and cooperating with said vent opening to adjust the effective size thereof.

10. In a tire inflater including cycling and gauging diaphragms, cycling and air admission valves, mechanism for operatively connecting said diaphragms with said valves and including bell cranks and valve stems for operating the valves; a diaphragm and valve assembly comprising a supporting plate, cycling and gauging diaphragms thereon, said supporting plate having means for pivoting said bell cranks and guides for said valve stems, a cover plate for retaining said daiphragms on said supporting plate and having a pair of recesses to cooperate with the diaphragms and thereby provide cycling and gauging diaphragm chambers, said cover plate having valve seats for said cycling and air admission valves to cooperate with, and having air inlet and air outlet passageways, a first port in said cover plate between said air inlet passageway and both of said valve seats, a second port therein between said cycling valve and said cycling diaphragm chamber and a third port therein between said air admission valve, said gauging diaphragm chamber and said outlet passageway, and a packing gland mounted in said supporting plate for said air admission valve stem.

11. In a tire inflater including cycling and gauging diaphragms, cycling and air admission valves, mechanism for operatively connecting said diaphragms with said valves and including bell cranks and valve stems for operating the valves; a diaphragm and valve assembly comprising a supporting plate, cycling and gauging diaphragms thereon, said supporting plate having means for pivoting said bell cranks and guides for said valve stems, a cover plate for retaining said diaphragms on said supporting plate and having a pair of recesses to cooperate with the diaphragms and thereby provide cycling and gauging diaphragm chambers, said cover plate having valve seats for said cycling and air admission valves to cooperate with, and having air inlet and air outlet passageways, a first port in said cover plate between said air inlet passageway and both of said valve seats, a second port therein between said cycling valve and said cycling diaphragm chamber and a third port therein between said air admisison valve, said gauging diaphragm chamber and said outlet passageway.

12. In a tire inflater including cycling and gauging diaphragms, cycling and air admission valves, mechanism for operatively connecting said diaphragms with said valves and including bell cranks and valve stems for operating the valves; a diaphragm and valve assembly comprising a supporting plate, cycling and gauging diaphragms thereagainst, said supporting plate having means for pivoting said bell cranks and guides for said valve stems, a cover plate for retaining said diaphragms against said supporting plate and having a pair of recesses to cooperate with the diaphragms and thereby provide cycling and gauging diaphragm chambers, said cover plate having valve seats for said cycling and air admission valves to cooperate with, and having air inlet and air outlet passageways, a first port between said air inlet passageway and both of said valve seats, a second port between said cycling valve and said cycling diaphragm chamber and a third port between said air admission valve, said gauging diaphragm chamber and said outlet passageway and a needle valve controlled vent in said cover plate affording communication between said cycling diaphragm chamber and atmosphere.

BURTON E. SHAW.